US008910560B2

(12) United States Patent
Irwin

(10) Patent No.: US 8,910,560 B2
(45) Date of Patent: Dec. 16, 2014

(54) ADJUSTABLE GUN MOUNT

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 102 days.

(21) Appl. No.: 13/862,093

(22) Filed: Apr. 12, 2013

(65) Prior Publication Data

US 2013/0269509 A1    Oct. 17, 2013

Related U.S. Application Data

(60) Provisional application No. 61/623,417, filed on Apr. 12, 2012.

(51) Int. Cl.
F41A 23/18    (2006.01)
F41A 23/00    (2006.01)
B60R 7/14    (2006.01)
F41A 23/26    (2006.01)

(52) U.S. Cl.
CPC ................. *F41A 23/005* (2013.01); *B60R 7/14* (2013.01); *F41A 23/18* (2013.01); *F41A 23/26* (2013.01)
USPC ............... 89/37.01; 42/70.11; 211/64; 211/4

(58) Field of Classification Search
CPC .......... F41A 23/18; B60R 7/14; A47B 81/005
USPC ...................... 211/4, 64; 89/37.01; 42/70.11
See application file for complete search history.

(56) References Cited

U.S. PATENT DOCUMENTS

| 2,998,885 | A | * | 9/1961 | Surface | 211/64 |
| 3,473,673 | A | * | 10/1969 | Porter | 211/64 |
| 4,057,180 | A | | 11/1977 | Whittaker | |
| 4,108,313 | A | * | 8/1978 | Bogar, Jr. | 211/64 |
| 4,560,134 | A | | 12/1985 | Klein | |
| 4,747,280 | A | | 5/1988 | Shaw | |
| 4,796,762 | A | * | 1/1989 | Law | 211/64 |
| 4,852,780 | A | | 8/1989 | Woodbury | |
| 4,986,427 | A | * | 1/1991 | Law et al. | 211/64 |
| 5,683,021 | A | | 11/1997 | Setina | |
| 5,697,181 | A | * | 12/1997 | Savant | 42/94 |
| 5,791,499 | A | | 8/1998 | Zebbedies | |
| 5,799,850 | A | | 9/1998 | Ryder | |
| D401,213 | S | | 11/1998 | Inchaurregui | |
| 6,360,931 | B1 | | 3/2002 | Morford | |
| 6,742,687 | B2 | | 6/2004 | Morford | |
| 6,834,454 | B2 | | 12/2004 | Klein | |
| 6,935,065 | B1 | * | 8/2005 | Oliver | 42/94 |
| 6,986,446 | B2 | | 1/2006 | Murray et al. | |
| 7,047,771 | B2 | | 5/2006 | Tanos | |
| 7,137,511 | B1 | | 11/2006 | Crowell et al. | |
| 7,200,965 | B2 | * | 4/2007 | Vor Keller et al. | 42/70.11 |
| 7,467,719 | B2 | | 12/2008 | Crowell et al. | |
| RE44,568 | E | * | 11/2013 | Stepp | 42/70.01 |
| 8,678,206 | B2 | * | 3/2014 | Kubiniec | 211/64 |
| 2006/0113341 | A1 | | 6/2006 | Murray et al. | |
| 2008/0110948 | A1 | | 5/2008 | Sutter | |
| 2011/0168649 | A1 | | 7/2011 | Stolz | |

* cited by examiner

Primary Examiner — Michael David
(74) Attorney, Agent, or Firm — Boyd D. Cox

(57) ABSTRACT

An adjustable gun mount is adapted for use in a motor vehicle and can be adjusted to support different sizes and types of weapons. The gun mount limits the release of a stored weapon to authorized users.

17 Claims, 4 Drawing Sheets

ADJUSTABLE GUN MOUNT

Priority for this application is claimed from U.S. Provisional Application No. 61/623,417 entitled "Adjustable Gun Mount" filed on Apr. 12, 2012.

BACKGROUND

The present invention is directed to an adjustable gun mount for supporting and locking various sized weapons in the interior area of a motor vehicle.

There is a need for police and other safety officers to safely secure their weapons in their motor vehicles in order to deter theft and to deter unauthorized access to those weapons. In many precincts, officers share their motor vehicles with other officers between shifts. Typically an officer will choose his or her own weapon to use in the field. The size and type of weapons generally vary from officer to officer and therefore each may require differently sized gun racks for holding the weapons in the vehicle.

In some cases, a weapon can be adjusted to fit the Particular officer using the weapon. This type of weapon is typically adjusted to fit on the standard sized gun racks generally found in safety vehicles. When needed by the officer, the weapon is removed from the rack and then adjusted to the appropriate size. An officer does not always have the luxury of time to adjust his or her weapon before using it. With the adjustable gun mount of the present invention, an officer can adjust the weapon before entering the vehicle and adjust the gun mount to hold the adjusted weapon.

With space at a premium, it is desirable to have a gun mount for a police vehicle that can easily be adjusted to secure a variety of different sizes and types of weapons.

The present invention provides an adjustable gun mount that can securely hold multiple weapons and that can be quickly adjusted to hold different types and sizes of weapons. In addition, the weapons can be securely locked to the gun mount to deter theft or unauthorized use.

SUMMARY

The present invention is an adjustable gun mount for supporting weapons on the interior of a motor vehicle. The gun mount can be adjusted to hold various sizes and types of weapons.

It is an object of the present invention to provide a gun mount that can lock weapons in a vehicle.

It is a further object of the present invention to provide a gun mount that can be readily adjusted to secure various sized weapons in a vehicle.

It is a further object of the present invention to provide a gun mount that can be readily adjusted to secure various types of weapons in a vehicle.

It is a further object of the present invention to provide a gun mount that can be readily adjusted to secure various models of guns in a vehicle.

It is a further object of the present invention to provide a gun mount for a motor vehicle that can be adjusted to hold different weapons suited for different users.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
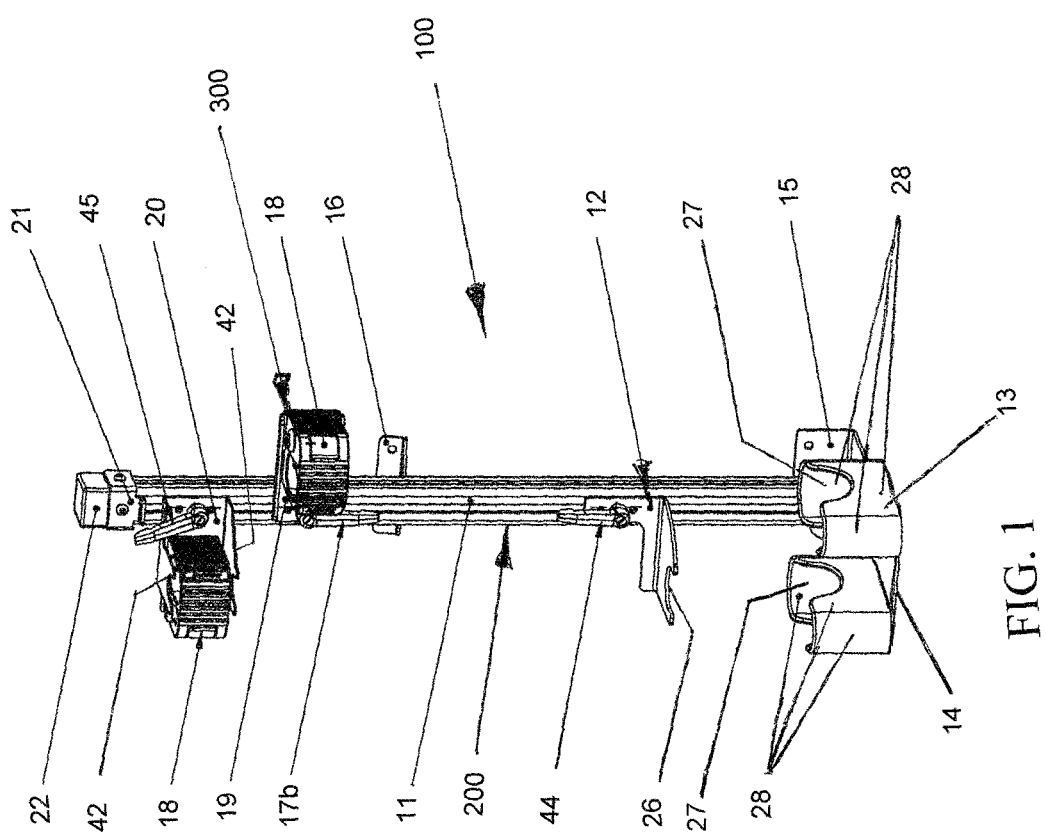
FIG. 1 is a front perspective view of a preferred embodiment of the gun mount of the present invention.

A preferred embodiment of the adjustable gun mount (100) of the present invention includes a rack (200) and one or more lock devices (300) as shown in FIGS. 1-4.

The rack (200) includes a backbone (11) having a lower mount bracket (15) and an upper mount bracket (16) for securing the backbone (11) in a motor vehicle. The rack (200) also includes a base (14) that supports a pair of butt plate boots (13). Disposed along a length of the backbone (11) is at least one arms rack charge bracket (12) and a keeper (21). Each of the arms rack charge brackets (12) has means for adjustably securing the arms rack charge bracket to the rack. The means for adjustably securing the arms rack charge bracket to the rack is an arms bracket clamp (44) that comprises a ratchet handle (17a). A rack cap (22) forms a protective sheath covering the top end of the backbone (11).

The lock device (300) comprises a releasable lock head (18) and a lock head bracket (19). Each of the lock head brackets (19) has means for adjustably mounting the lock head bracket on the rack. The means for adjustably mounting the lock head bracket on the rack is a head bracket clamp (45) that comprises a ratchet handle (17b).

The lock head (18) includes a lock head housing (30) and lock means. Preferably, the lock means comprise a lock element (33), such as a lock cylinder. However, other suitable locking devices could be used instead. The lock head housing (30) contains and protects the lock element (33). The lock head (18) further comprises a lock head latch (32) that is pivotally attached to the lock head housing (30) by a hinge (35). The lock head housing (30) has a U-shaped cradle (36). A spring (34) is attached at one end to the lock head latch (32) and attached at an opposite end to the lock head housing (30).

On the lock device (300), the lock head latch (32) is arcuately shaped. The arcuate shape of the lock head latch (32) and the U-shape of the lock head's cradle (36) cooperate to form a generally ovate shape for the opening (46) on the lock device (300) that receives the barrel of a weapon stored on the gun mount (100). Although the cradle (36) of the lock head housing (30) and lock head latch (32) cooperate to form the oval-shaped opening (46), in this preferred embodiment, the shape could vary to include circular or other geometric shapes.

The backbone (11) is preferably an elongated element comprised of aluminum and having a generally rectangular shaped cross section with a front side (23) and a back side (24). The backbone (11) is an extruded metal material and comprises T-shaped locking slots (25) extending along the length of the front side.

On the gun mount (100), the backbone (11) provides the central upright support for holding weapons. The upper (16) and lower (15) mount brackets are secured to the rear side of the backbone (11) and are further secured to the interior of the vehicle thereby attaching the gun mount (100) within the vehicle.

The arms rack charge bracket (12) assists in positioning a weapon as it is being placed in the gun mount (100). A weapon seat (26) on the arms rack charge bracket (12) receives the weapon and aligns it in a vertical disposition. Below the arms rack charge bracket (12) is a pair of butt plate boots (13). Each butt plate boot (13) is adapted to receive the butt or stock of a weapon therein. The gun stock is held within an interior area (27) defined by a plurality of upstanding walls (28) that form the butt plate boot (13). The base (14) on a lower end of the backbone (11) supports the butt plate boots (13).

Near the upper end of the backbone (11), the keeper (21) provides a limit stop for the lock head brackets (19) slideably attached to the backbone (11). Consequently, the lock devices (300) are retained on the backbone (300) and are not readily removeable. The barrel lock brackets (20) and the respective lock devices (300) can releasably secure an upper end of the supported weapon and lock the barrel of weapon onto the gun mount (100).

The adjustable lock device (300) is adjustably mounted on the front side of the backbone (11) and can be moved to different locations along the backbone (11). The different adjusted positions of the lock device (300) on the backbone (11) enables the gun mount (100) to accommodate differently sized weapons. The keeper (21) retains the lock devices (300) on the backbone (11). The rack cap (22) on the uppermost end of the backbone (11) is a protective sheath preferably comprised of rubber or plastic.

On each lock device (300), a lock head bracket (19) adjustably secures the respective lock head (18) to the backbone (11). A head bracket clamp (45) disposed on each lock device (300) can be actuated between a locked and unlocked position to secure the lock head bracket (19) in selected positions along the backbone (11).

Figure 2:
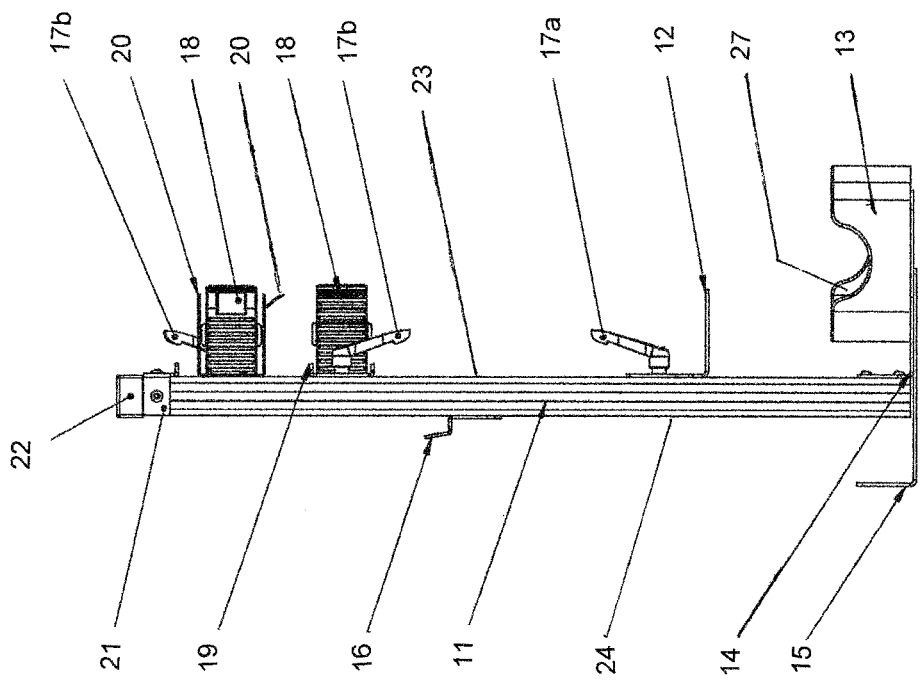
FIG. 2 is a side view of the gun mount shown in FIG. 1.
Figure 3:
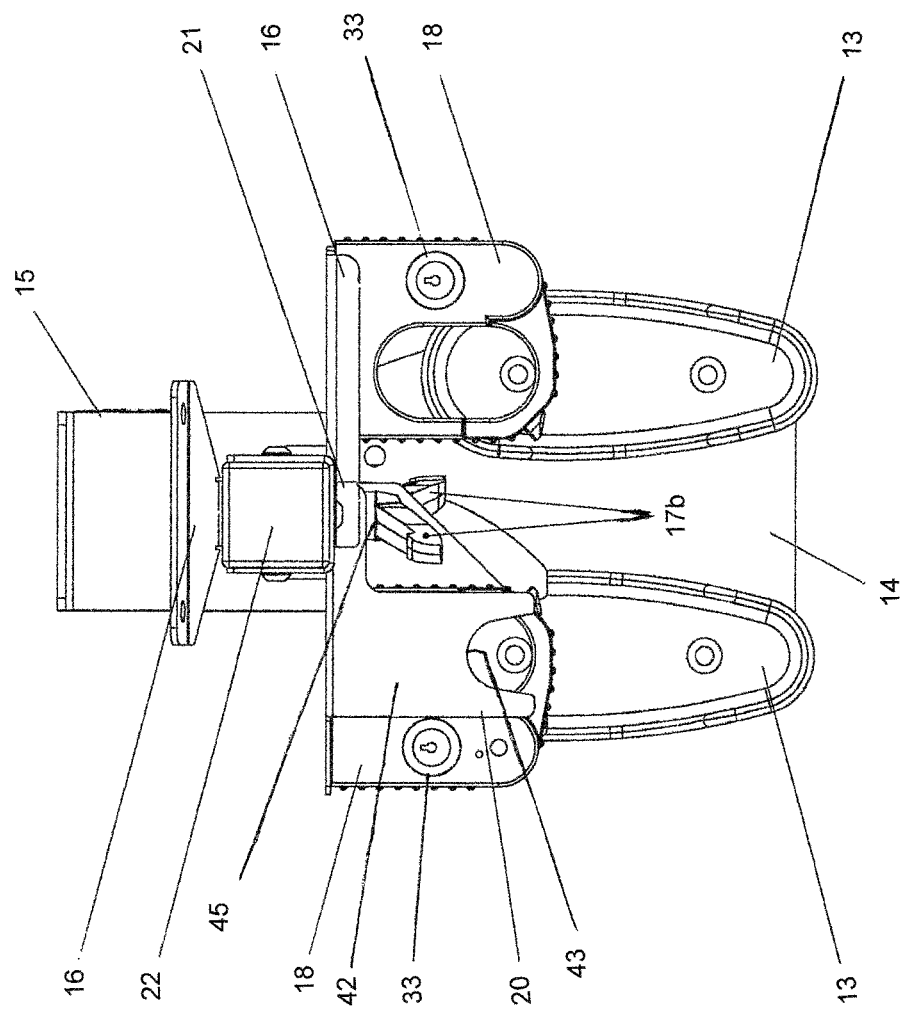
FIG. 3 is a top view of the gun mount shown in FIG. 1.
Figure 4:
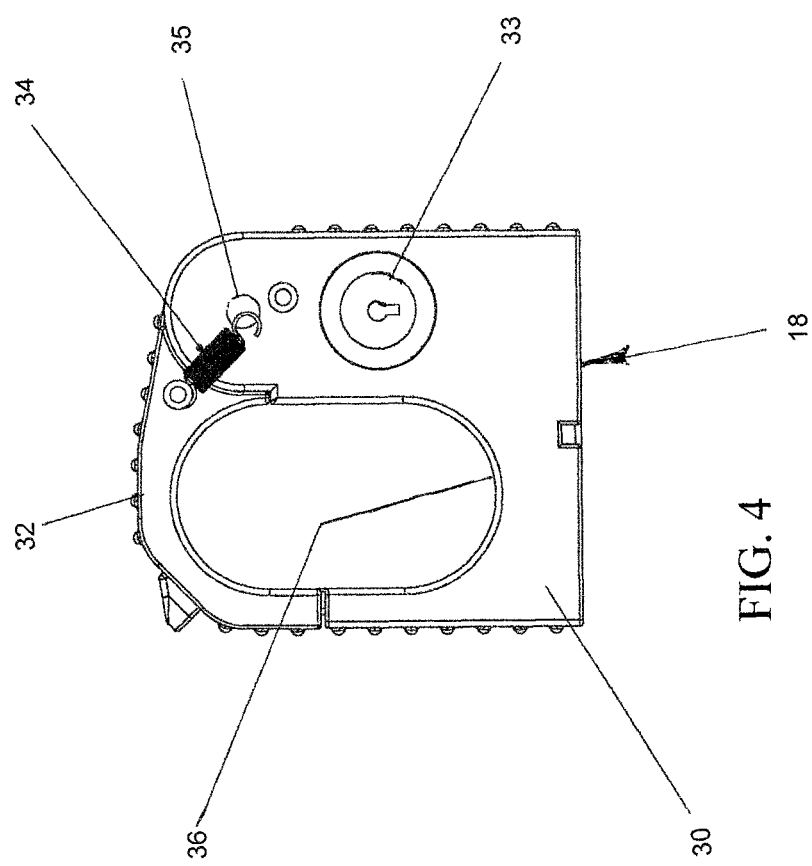
FIG. 4 is a side view of a lock device of the gun mount shown in FIG. 1.

At least one of the lock devices (300) can include barrel lock brackets (20). The barrel lock brackets (20) are disposed adjacent to the lock head (18) with one barrel lock bracket disposed on one side of the lock head housing (30) and the other barrel lock bracket disposed on the opposite side of the lock head housing (30), as shown in FIGS. 2 and 3. Each barrel lock bracket (20) comprises a plate (42) having a cutout portion (43) that is arcuately shaped. The cutout portions (43) overlay both sides of at least part of the opening (46) on the lock head (18). The barrel lock brackets (20) are adjacent to and cooperate with the lock head (18) to restrict the size of the opening (46) in order to securely hold a mounted weapon having a smaller diameter barrel.

The lock head latch (32) acts as a gate that can be opened and closed to control access into the opening (46) on the lock head (18) to releasably secure a weapon on the gun mount (100). When the lock head latch (32) is closed and in the locked configuration, the barrel of the stored weapon is retained within the opening (46) on the lock head housing (30).

The hinge (35) pivotally attaches the lock head latch (32) to the lock head housing (30), thereby allowing the lock head latch (32) to pivot between opened and closed positions on the lock head housing (30) Preferably, the hinge (35) includes a pin that extends through apertures in the lock head latch (32) and the lock head housing (30). The hinge (35) allows a free end of the lock head latch (32) to pivot outwardly from the lock head housing (30) between closed and opened positions. The spring (34) biases the lock head latch (32) into a closed position, while allowing the latch (32) to be swung open when not locked.

The lock devices (300) have locked and unlocked configurations. In the locked configuration, the lock element (33) secures the lock head latch (32) in the closed position against movement on the lock head housing (30). In the unlocked configuration, the lock element (33) is released and the lock head latch (32) is free to pivot between opened and closed position.

The lock head latch (32) acts as a gate that controls access to the opening (46) on the lock head (18). The lock head latch (32) releasably secures a weapon on the gun mount (100). When the lock head latch (32) is closed and the lock device (300) is in the locked configuration, the barrel of the stored weapon is retained within the opening (46) on the lock head housing (30).

The lock devices (300) are adjustably secured to the front side of the backbone (11). On the backbone (11), the lower mount bracket (15) is disposed on the rear side at the lower end and the upper mount bracket (16) is attached to the rear side at a point between the upper and lower ends of the backbone (11). Also, on the lower end of the backbone (11) is the base (14) that supports the butt plate boots (13) thereon.

Both the arms rack charge bracket (12) and the lock devices (300) are adjustably mounted on the front side of the backbone (11). On the arms rack charge bracket (12), the arms bracket clamp (44) releasably engages the backbone (11). The arms bracket clamp (44) has locked and unlocked positions. In the locked position, the arms bracket clamp (44) is secured against movement on the backbone (11). In the unlocked position, the arms rack charge bracket (12) is released and can slide along the locking slot (25) on the backbone (11).

Similarly, the head bracket clamp (45) releasably engages the locking slot (25) disposed along the front side (23) of the backbone (11). The head bracket clamp (45) comprises locked and unlocked positions. In the locked position, the head bracket clamp (45) is secured against movement on the backbone (11). In the unlocked position, the head bracket clamp (44) is released and allowed to slide along the locking slot (25) on the backbone (11).

In a preferred embodiment, the head bracket clamp (45) and the arms bracket clamp (44) respectively comprise respective ratchet handles (17b, 17a). Although ratchet handles are preferred, other types of suitable clamps could be used instead. It is noted that preferably the clamps are constructed so that they can be loosened and tightened to adjust their position on the backbone (11), but not be disassembled to be easily removed from the gun mount (100). To remove a clamp from the mount, an end of the spine must be open so that the clamp can be slid along its associated slat and off the spine through such open end. This construction deters removal of a weapon secured on the mount by disassembling parts of the mount which are used to hold the weapon in place.

The opening (46) on the lock device (300) is formed by the lock head housing (30) and lock head latch (32) and the opening (46) functions to hold a weapon therein. As shown in FIG. 3, the barrel lock brackets (20) partially cover the opening (46). Therefore, the effective size of the opening (46) is changed by the presence of the barrel lock brackets (20) on the lock head (18). The effective size of the opening (46) is made smaller by the barrel lock brackets (20) on the lock head (18).

The opening (46) on each of the lock devices (300) is sized to receive the barrel of a weapon therein. Similarly, the butt plate boot (13) has an interior area (27) that is sized to fit the stock of most guns.

In the unlocked configuration, the lock head latch (32) can be pivoted moved away from the lock head housing (30) by exerting enough force to overcome the force of the spring (19) and access into the opening (46) can occur. Therefore in the unlocked configuration, one end of the lock head latch (32) can be moved away from the lock head housing (30) to allow access into the opening (46) in order to remove a weapon from or to insert a weapon into the lock head (18).

The spring (34) naturally biases the lock head latch (32) into a closed position in which the cradle (36) remains closed by the force of the spring (34). However, when the lock device (300) is in the unlocked configuration, the lock head latch (32) can be forced open against the bias of the spring (34).

With the lock device (300) in the unlocked configuration, a weapon held in the gun mount (100) can be readily removed therefrom by simply pulling against the force of the spring (34) to open the lock head latch (32) and releasing the stored weapon. Consequently, in this unlocked configuration, a stored weapon can be easily retrieved.

To deter such ready removal, the weapon is placed in the gun mount (100) with the gun's stock seated in the butt plate boot (13) and the barrel of the weapon cradled within the opening (46) of the associated lock head (18). The lock device (300) is placed in a locked configuration by means of the lock element (33) and the lock head latch (32) will not allow access into the opening (46).

One of the butt plate boots (13) is aligned with one of the lock devices (300) along the front side (23) of the backbone (11). The arms rack charge bracket (12) is disposed between and aligned with one of the lock devices (300) and the associated aligned butt plate boot (13).

For a preferred use, the gun mount (100) is mounted in a motor vehicle by placing the mount (100) in the desired location with the base (14) preferably resting on a support surface and the butt plate boots (13) positioned beneath respective lock devices (300). The upper (16) and lower (15) mount brackets are attached to the interior of the vehicle.

The gun mount (100) is adjusted to fit a weapon. To adjust the gun mount (100), the head bracket clamp (45) is released on the selected lock device (300) and the lock device (300) is moved to the desired location by sliding along the backbone (11). When the lock device (300) is positioned in the desired location along the backbone (11), the head bracket clamp (45) is locked into position. The arms rack charge bracket (12) is adjusted into the desired position by releasing the arms bracket clamp (44) on the arms rack charge bracket (12), sliding the arms rack charge bracket (12) to the desired location along the backbone (11), and then locking the arms bracket clamp (44) to secure the arms rack charge bracket (12) in place on the backbone (11).

A weapon is mounted onto the gun mount in the following manner. With the lock device (300) in the unlocked configuration, the stock of the weapon is placed in the interior area (27) of a butt plate boot (13), an aligned lock head latch (32) is forced open against the spring's biasing force, and the barrel of the gun is placed in the opening (46). The lock head latch (32) is released to close access into the opening (46) with the barrel resting in the opening (46). The lock device (300) is then moved to the locked configuration by utilizing the lock element (33). This locks the lock head latch (32) in a closed position against movement, thereby securing the weapon on the gun mount (100).

To remove a secured weapon from the gun mount (100), the lock device (300) is moved into the open configuration, whereby the lock head latch (32) is released to swing outwardly from the lock head housing (30) and thereby allow access to the opening (46). To move the lock device (300) into the open configuration, the lock element (33) is used to release the lock head latch (32), leaving the lock head latch (32) free to pivot on the lock head housing (30). With the lock device (300) in the open configuration, a weapon can be removed by swinging the lock head latch (32) away from the lock head housing (30) and releasing the barrel of the weapon from the gun mount as the stock is lifted out of the butt plate boot (13).

The locking gun mount of the present invention provides a means to secure weapons inside of a safety vehicle and also to deter theft and unauthorized use.

In addition, with the lock devices (300) adjustably mountable on the backbone (11) of the rack (200), the gun mount (100) can be adjusted to fit and securely hold different sizes and/or types of weapons. Thus, safety vehicles that are used by multiple officers can still provide means to lock various sizes and types of weapons safely within the vehicle.

The versatility of the gun mount's modular design allows mounting in various locations, including on a partition, trunk tray, the center divider, or floorboard.

It is noted that the gun mount of the present invention could be adapted to secure any number of weapons and could be used in locations other than a motor vehicle. Such locations may include a boat, plane, home, business or other desired place.

Although the present invention has been described in considerable detail with reference to certain preferred versions thereof, other versions are possible. Therefore, the spirit and scope of the appended claims should not be limited to the description of the preferred versions contained herein.

The invention claimed is:

1. An adjustable gun mount for supporting and securing weapons, the adjustable gun mount comprising: at least one lock device for securing a weapon; a rack for supporting the at least one lock device; said at least one lock device comprises a releasable lock head and a lock head bracket; wherein said lock head bracket supports the lock head at selected positions on the rack and said lock head releasably secures a weapon therein; wherein said rack comprises a backbone having at least one locking slot disposed on said backbone; said lock head bracket comprises a head bracket clamp wherein said head bracket clamp releasably engages said locking slot on the backbone; wherein when the head bracket clamp is unlocked, said lock device is allowed to slide along the locking slot; and when the head bracket clamp is locked, the lock device is secured in position; wherein to selectively position the lock device on the backbone, the head bracket clamp is unlocked; said at least one lock device is moved to a selected position on the backbone; the head bracket clamp is locked to the backbone, thereby securing the lock device in the selected position on the backbone; wherein said lock head comprises a lock head housing and a lock head latch; said lock head housing includes a cradle; wherein said lock head latch is pivotally attached to said lock head housing; said lock head latch and said cradle form an opening on the lock head; and said lock head latch pivots open to allow access into the opening.

2. The adjustable gun mount of claim 1, wherein at least one of said lock devices comprises at least one barrel lock bracket;
said barrel lock bracket comprises a plate;
said plate includes a cutout portion having an arcuate shape;
said at least one barrel lock bracket is mounted on the lock head bracket; said barrel lock bracket is mounted adjacent to said lock head with said plate extending adjacent to said lock head housing, wherein said cutout portion overlays at least a portion of the cradle.

3. The adjustable gun mount of claim 2, wherein said at least one barrel lock bracket comprises two barrel lock brackets;
wherein each of said two barrel lock brackets is mounted on opposite sides of the lock head housing and extends adjacent to the lock head housing.

4. The adjustable gun mount of claim 3, wherein said rack comprises an arms rack charge bracket;
said arms rack charge bracket includes an arms bracket clamp;

wherein said arms bracket clamp releasably secures the arms rack charge bracket to the backbone at selected positions along said locking slot; and wherein said arms rack charge bracket aligns the weapon with the gun mount.

5. The adjustable gun mount of claim 4, wherein said arms rack charge bracket comprises a weapon seat having an arcuate shape for receiving a weapon thereon.

6. The adjustable gun mount of claim 1, wherein said rack further comprises a base for supporting the backbone and at least one butt plate boot for holding the stock of a weapon supported on the gun mount.

7. The adjustable gun mount of claim 6, wherein said at least one butt plate boot comprises a plurality of upstanding walls that define an interior area for receiving the weapon's stock therein.

8. The adjustable gun mount of claim 7, wherein said base is disposed at a lower end of the backbone, and said at last one butt plate boot comprises a pair of butt plate boots that are disposed on said base.

9. The adjustable gun mount of claim 6, wherein said rack further comprises at least one mount bracket;

wherein said at least one mount bracket is attached to the rack and is adapted for attachment to a vehicle.

10. The adjustable gun mount of claim 1, wherein said rack comprises an arms rack charge bracket;

said arms rack charge bracket includes an arms bracket clamp;

wherein said arms bracket clamp releasably secures the arms rack charge bracket to the backbone at selected positions along said locking slot; and wherein said arms rack charge bracket aligns the weapon on the gun mount.

11. The adjustable gun mount of claim 10, wherein said arms rack charge bracket comprises a weapon seat having an arcuate shape for receiving a weapon thereon.

12. An adjustable gun mount for supporting and securing a variety of different weapons, the adjustable gun mount comprising: at least one lock device for securing the weapon; a rack for supporting the at least one lock device; said at least one lock device comprises a lock head and a lock head bracket for supporting the lock head; and each of said lock devices further comprises means for adjustably securing the lock head bracket on the rack; wherein each of said lock heads comprises a cradle for holding the barrel of a supported weapon; said rack comprises at least one butt plate boot for receiving the stock of a supported weapon; at least one of said lock devices comprises at least one barrel lock bracket disposed on said lock head bracket; said at least one barrel lock bracket comprises a plate; said plate having a cutout portion with an arcuate shape; and wherein said at least one barrel lock bracket is mounted on the lock head bracket of a respective lock device; said at least one barrel lock bracket is positioned adjacent the lock head and said cutout portion overlays the cradle.

13. The adjustable gun mount of claim 12, wherein said rack further includes at least one arms rack charge bracket having means for adjustably securing the arms rack charge bracket to the rack.

14. The adjustable gun mount of claim 13, wherein said rack comprises a backbone having at least one locking slot extending a length thereof; and said means for adjustably securing the arms rack charge bracket to the rack cooperates with said locking slot to selectively position the arms rack charge bracket on said backbone.

15. The adjustable gun mount of claim 14, wherein at least one arms rack charge bracket comprises a weapon seat for supporting a weapon thereon.

16. An adjustable gun mount for supporting and locking different sizes and types of weapons in a motor vehicle, the adjustable gun mount comprising:

a rack and a plurality of lock devices;

said rack comprises a backbone, lower and upper mount brackets, a base for supporting the backbone, at least one arms rack charge bracket, and a keeper;

said backbone comprises a front side, a back side, and at least one locking slot;

said base comprises a pair of butt plate boots, wherein each of said butt plate boots includes a plurality of upstanding walls and an interior area;

said arms rack charge bracket includes an arms bracket clamp having a weapon seat;

said weapon seat is U-shaped and adapted to guide a weapon into a position of alignment with the lock device when installing a weapon on the gun mount;

each of said plurality of lock devices comprises a lock head, a lock head bracket, and a barrel lock bracket;

said lock head comprises a lock head housing, a lock head latch, an opening, a hinge, and a spring;

said lock head bracket comprises a head bracket clamp;

each of said barrel lock brackets comprises a plate;

each of said plates includes an arcuate cutout portion;

said lock head housing comprises a cradle and a lock element;

wherein said barrel lock brackets are disposed on a respective lock head with one of said plates disposed on one side of the lock head and an other of said plates disposed on an opposite side of the lock head; and said arcuate cutout portions at least partially overlaying the opening on the lock head;

wherein each of said lock heads is adjustably mounted on the backbone by a respective lock head bracket;

said arms bracket clamp releasable secures the arms rack charge bracket at a selected position along the backbone;

each of said head bracket clamps comprises locked and unlocked positions; wherein in said locked position, the head bracket clamp is secured against sliding movement on the backbone; and in said unlocked position, the head bracket clamp is released and is allowed to slide along the locking slot on the backbone;

said arms bracket clamp further comprises locked and unlocked positions; wherein in the locked position, the arms bracket clamp is engaged and the arms rack charge bracket is secured against sliding movement on the backbone; in the unlocked position, the arms bracket clamp is released and the arms bracket clamp is free to slide on the backbone to various selected positions;

each of the lock devices further comprises locked and unlocked configurations; wherein in the locked configuration, the lock head latch is closed and secured against movement on the lock head housing; and in the unlocked configuration, the lock head latch is free to open, thereby allowing access to the cradle is allowed;

wherein said lock head latch is pivotally attached to the lock head housing by said hinge and can be opened when the respective lock device is in the unlocked configuration;

wherein one end of the spring is attached to the lock head latch, an opposite end of the spring is attached to the lock head housing, and the spring biases the lock head latch toward the lock head housing;

wherein said lower and upper mount brackets are attached to the back side of the backbone and are adapted to secure the gun mount to the interior of a vehicle;

wherein said opening is adapted to receive the barrel of a weapon supported on the gun mount;

wherein said locking element controls the locked and unlocked configurations of each respective lock device;

wherein to adjust the gun mount to accommodate different sizes and shapes of weapons, each of said lock heads is moved to a selected position on the backbone that coincides with the supported weapon's size and shape, and said arms rack charge bracket is moved to a selected position on the backbone that coincides with the weapon;

wherein to move the lock head to a selected position, the respective head bracket clamp is released, the lock head is moved to the selected position, and the head bracket clamp is engaged to secure the lock head in place on the backbone;

wherein to move an arms rack charge bracket to a selected position on the backbone, the arms bracket clamp is released, the arms rack charge bracket is moved to the selected position, and the arms bracket clamp is engaged to secure the lock head in place on the backbone;

wherein to mount a weapon on the gun mount, the gun mount is adjusted to coincide with the weapon; the stock of the weapon is placed in the interior area of one of the butt plate boots; the lock device is moved into the unlocked configuration using the lock element; the lock head latch is opened, and the barrel of the weapon is placed in the opening of the lock head; the lock head latch is closed around the weapon; and the lock device is moved into the locked configuration using the lock element, thereby securing the weapon on the gun mount; and wherein to remove a secured weapon from the gun mount, the lock device is moved to the unlocked configuration using the lock element; the lock head latch is pivoted outwardly to the opened position; and the weapon is removed.

17. The adjustable gun mount of claim 16 further comprises a keeper disposed on an end of the backbone that is opposite said base, wherein said keeper is a limit stop for retaining the lock devices and the arms rack charge bracket disposed on the backbone.

\* \* \* \* \*